United States Patent [19]
Hoppe et al.

[11] Patent Number: 5,201,441

[45] Date of Patent: Apr. 13, 1993

[54] ROTARY FEEDER WITH IMPROVED SEAL ARRANGEMENT BETWEEN THE LATERAL ROTOR DISK AND THE PERTAINING BEARING COVER

[75] Inventors: Hans Hoppe, Vogt; Walter Beirle, Ravensburg; Rudolf Fühl, Vogt, all of Fed. Rep. of Germany

[73] Assignee: Waeschle Maschinenfabrik GmbH, Ravensburg, Fed. Rep. of Germany

[21] Appl. No.: 723,938

[22] Filed: Jul. 1, 1991

[30] Foreign Application Priority Data

Jul. 6, 1990 [DE] Fed. Rep. of Germany ....... 4021630
Apr. 26, 1991 [DE] Fed. Rep. of Germany ....... 4113738

[51] Int. Cl.⁵ .............................................. G01F 11/10
[52] U.S. Cl. .................................. 222/368; 222/410
[58] Field of Search ............... 222/251, 344, 367, 368, 222/410, 411; 277/12, 106, 181, 189

[56] References Cited

U.S. PATENT DOCUMENTS 4,602,727  7/1986  Jackson ........................ 222/410 X
4,946,078  8/1990  Heep et al. ..................... 222/386
5,014,885  5/1991  Heep et al. ..................... 222/368

FOREIGN PATENT DOCUMENTS 124958   8/1947  Australia ....................... 277/106
1303782  4/1987  U.S.S.R. ........................ 277/189
2186035  8/1987  United Kingdom ................ 277/189

*Primary Examiner*—Andres Kashnikow
*Assistant Examiner*—Joseph A. Kaufman
*Attorney, Agent, or Firm*—Henry M. Feiereisen

[57] ABSTRACT

In a rotary feeder of the type including a housing provided with a top inlet and a bottom outlet and accommodating a cellular rotor which includes a plurality of radial blades supported on a horizontal shaft and axially defined by respective lateral disks which are spaced from pertaining bearing covers, a seal arrangement is provided between each lateral disk and pertaining bearing cover of the housing and includes a plastic filler ring which is floatingly arranged between the bearing cover and the disk and is spring-loaded in axial and radial direction.

14 Claims, 2 Drawing Sheets

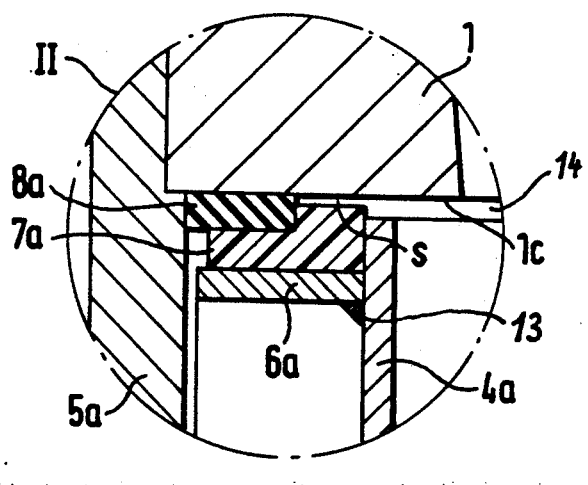
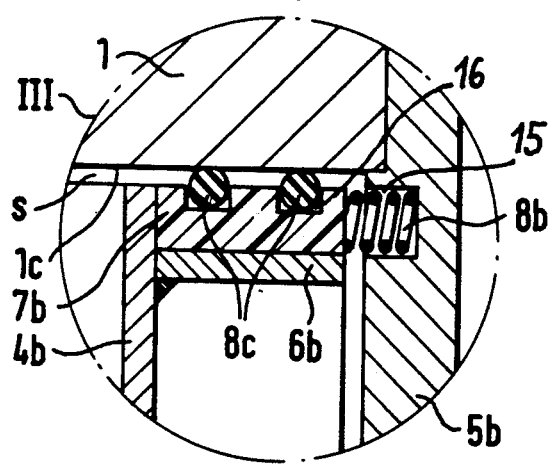
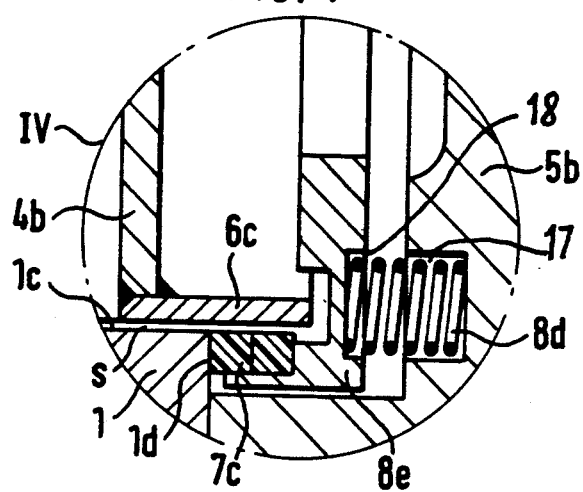

5,201,441

ROTARY FEEDER WITH IMPROVED SEAL ARRANGEMENT BETWEEN THE LATERAL ROTOR DISK AND THE PERTAINING BEARING COVER

BACKGROUND OF THE INVENTION

The present invention refers to an apparatus for feeding bulk material, in particular to a rotary feeder of the type including a housing provided with a top inlet and a bottom outlet and accommodating a cellular rotor which includes a plurality of radial blades supported on a horizontal shaft and axially defined by respective lateral disks which are spaced from pertaining bearing covers by which the axial sides of the housing are closed, with a seal arrangement provided between each lateral disk and pertaining bearing cover of the housing.

A known seal arrangement for a rotary feeder of this type includes an elastic slide ring which extends between each lateral disk and pertaining bearing cover and is urged against the bearing-cover-facing side of the lateral disk. The use of such a slide ring is disadvantageous as it is subjected to unavoidable wear which is augmented with increasing contact pressure by which the slide ring is pressed against the end face of the lateral disk. The required contact pressure to act upon the slide becomes even greater with increasing pressure differential between the inlet port and the outlet port of the rotary feeder. A further drawback of such a slide ring resides in the difficulty to create a suitably long sealing gap in flow direction. The creation of a longer sealing gap is desired since the sealing action improves with longer and narrower sealing gap. However, a corresponding widening of the slide ring increases the danger of an uneven wear with increasing width of the slide ring.

SUMMARY OF THE INVENTION

It is an object of the present invention to provide a rotary feeder with improved seal arrangement obviating the afore-stated drawbacks.

This object, and others which will become apparent hereinafter, are attained in accordance with the present invention in a rotary feeder of the above type with a seal arrangement which includes a metal ring extending coaxial to the rotor axis and being affixed to the disk at the side facing the adjacent bearing cover, a plastic filler ring loosely surrounding the metal ring, with the plastic filler ring defining with the housing wall a sealing gap and being spring-loaded in axial and radial directions.

A connection of the metal ring coaxially to the rotor axis with the bearing-cover-facing side of the disk creates a long flow path in which the filler ring is now floatingly disposed. Even though the filler ring is stationary relative to the metal ring, the selected floating construction requires only small radial and axial contact pressures which can be provided by suitable spring means. The filler ring is thus essentially free from forces and subjected to only slight wear.

The sealing gap which remains between the outer circumferential surface of the filler ring and the respective inner wall surface of the rotor housing creates the conditions for allowing the floating arrangement of the filler ring relative to the housing and can be dimensioned in very small manner. The gap width can be dimensioned equal to the thermal expansion (that is diametric enlargement) of the lateral rotor disks at highest possible operational temperature, plus the usual tolerances for compensating out-of-round and a possible flexure of the rotor shaft at great pressure differential between the inlet side and the outlet side of the rotary feeder. The narrow sealing gap and the extended length of the gap result in a superior sealing effect. At the same time all drawbacks attributed to conventional seal arrangements are eliminated, such as high wear, heating and thus expansion of the lateral rotor disks because of friction between the disks and the seal arrangement, and cumbersome and complicated control systems for adjusting the contact pressure of the seal arrangement.

According to a further feature of the present invention, the filler ring is acted upon by spring means which may be a profile ring positioned in slightly compressed conditions in a recess of the filler ring so as to be able to exert radial and axial forces by which the filler ring is slightly pressed against the disk and the metal ring. Instead of a profile ring, the filler ring may be loaded in axial direction by a helical compression spring which extends between the bearing cover and the filler ring, and in radial direction by at least one elastomer ring which is placed in a groove about the outer circumferential surface of the filler ring and bears against the facing inner housing wall.

Since metal and plastic have very different thermal expansion coefficients, it is advantageous to provide the filler ring with a slot at a suitable location of its circumference. In this manner, an expansion due to temperature rise are compensated and cannot lead to stress concentrations.

According to yet another feature of the present invention, the spring means for acting upon the filler ring in axial and radial directions includes a helical compression spring and a profile ring, with the compression spring extending between the bearing cover and the profile ring. The filler ring is received in a recess of the profile ring and is axially sandwiched between the profile ring and the inner housing wall. In this manner, the axial force applied by the compression spring causes also a deformation of the filler ring in radial direction against the metal ring.

BRIEF DESCRIPTION OF THE DRAWING

The above and other objects, features and advantages of the present invention will now be described in more detail with reference to the accompanying drawing in which:

FIG. 2 is an enlarged sectional view of the rotary feeder illustrating in detail the seal arrangement in circled area II indicated in FIG. 1;

FIG. 3 is an enlarged sectional view of the rotary feeder illustrating in detail the seal arrangement in circled area III indicated in FIG. 1; and FIG. 4 is an enlarged sectional view of the rotary feeder illustrating in detail the seal arrangement in circled area IV indicated in FIG. 1.

DETAILED DESCRIPTION OF PREFERRED EMBODIMENTS

Figure 1:
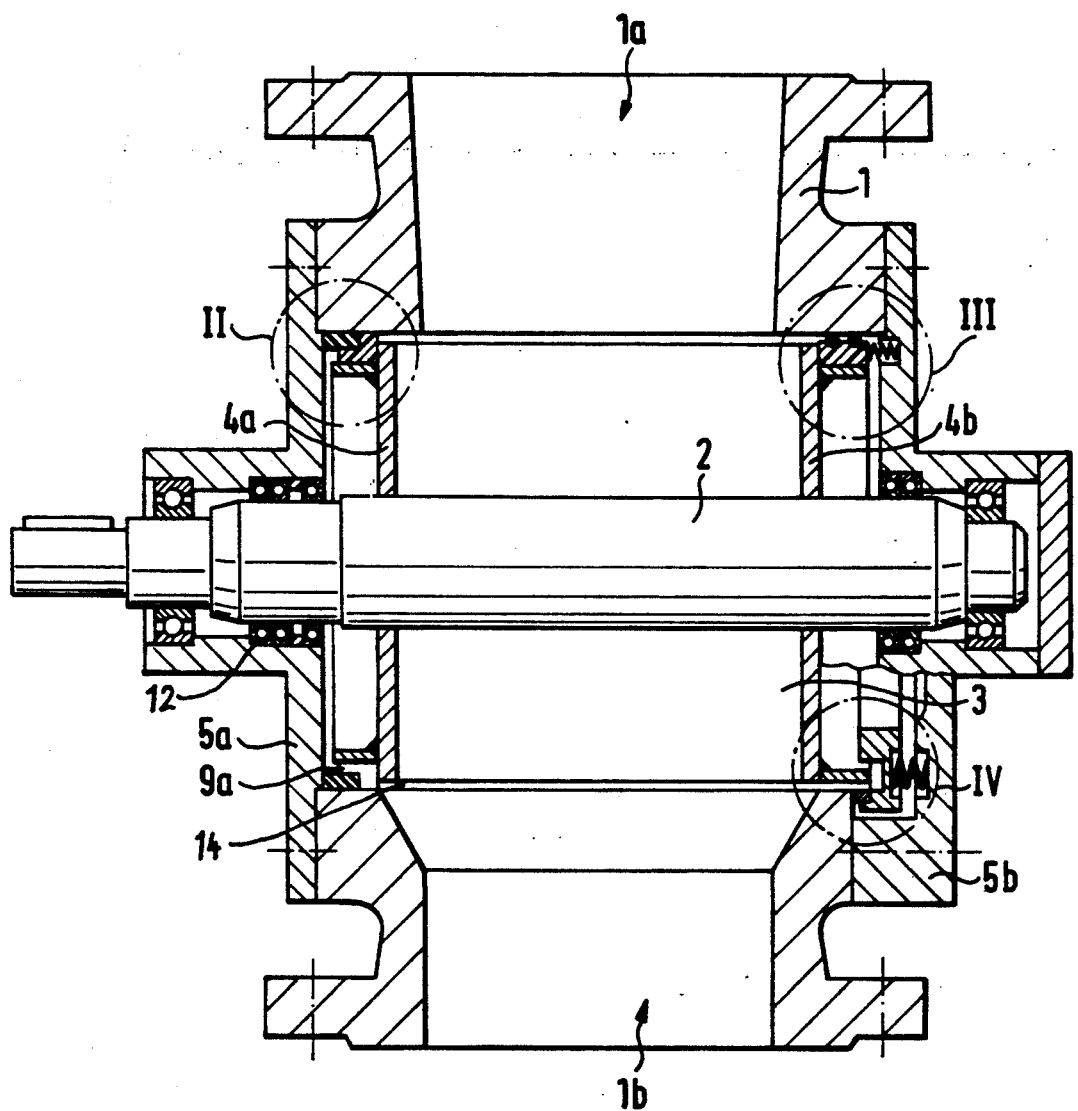
FIG. 1 is a partly longitudinal section of a composite illustration of a rotary feeder combining various embodiments of a seal arrangement according to the present invention.

Referring now to the drawing and in particular to FIG. 1, there is shown a partly longitudinal section of a composite illustration of a rotary feeder for transporting material such as bulk material, combining various embodiments of a seal arrangement according to the present invention. The rotary feeder includes a housing 1 which defines an interior space with a top inlet port 1a and a bottom outlet port 1b. The pressure differential between the inlet port 1a and the outlet port 1b can be in the magnitude of e.g. several bar (hectopascal). A cellular rotor is arranged in the interior space of the housing 1 and includes a plurality (e.g. 12) of rotor blades or vanes 3 which are securely fixed to a shaft 2 and extend with their peripheral radial end faces toward the inner wall surface of the housing 1 to thereby define compartments for transporting material from the inlet port 1a to the outlet port 1b. The blades 3 are preferably metallic plates with a radial length sufficiently dimensioned so that a gap 14 is defined between the radial end face of the blades 3 and the inner wall surface 1c of the housing 1.

The blades 3 extend between opposing lateral disks 4a, 4b which thus define and bound the rotor blades 3 in axial direction and which are securely mounted on the shaft 2. The shaft 2 traverses the lateral disks 4a, 4b and is rotatively supported by suitable bearings 12 accommodated in laterally arranged bearing covers 5a, 5b which are securely mounted to the housing 1 at an axial distance to the disks 4a, 4b.

It will be appreciated by persons skilled in the art that the rotary feeder must contain much mechanical apparatus which does not appear in the drawing. For example, the shaft 2 is operatively connected to a drive mechanism in order to suitably rotate the blades. However, this mechanism, like other necessary apparatus, is not part of the invention, and has been omitted from the Figures for sake of simplicity.

Interposed between each bearing cover 5a, 5b and the adjacent disk 4a, 4b is a seal arrangement by which a flow of leakage air from the inlet side to the outlet side or vice versa is avoided.

Persons skilled in the art will understand that FIG. 1 is a composite illustration of a rotary feeder in which the various seal arrangements according to the invention are incorporated together in order to show the general environment in which the seal arrangement according to the invention are installed.

Turning now to FIG. 2, there is shown, on an enlarged scale, a sectional view of one embodiment of a seal arrangement as indicated in FIG. 1 by the circled area II. The seal arrangement includes a metal ring 6a which is securely fixed at one axial end to the disk 4a e.g. through welding as indicated at 13. The metal ring 6a extends coaxial to the rotor axis, with its other axial end being spaced at a slight distance from the facing bearing cover 5a. Placed loosely upon the metal ring 6a is a filler ring 7a made of plastic material such as e.g. polytetrafluoroethylene (PTFE), aramide, polyethylene (PE), polyaryl ether ketone (PEEK). The filler ring 7a may be made as a massive ring or may be a braided ring of individual strands of suitable material. At stationary rotor, without differential pressure between the inlet port 1a and the outlet port 1b of the rotary feeder, and at ambient temperature, a narrow sealing gap s is created in prolongation of the gap 14 between the outer circumferential surface of the filler ring 7a and the cylindrical inner wall surface 1c of the housing 1.

At its end face opposing the bearing cover 5a, the filler ring 7a has a diametric step or is recessed so as to have an approximately L-shape configuration. Placed in the recess is a profile ring 8a which is of rectangular cross section and is made of elastomer e.g. rubber sponge. The elastic profile ring 8a is suitably dimensioned to project beyond the filler ring 7a in radial direction toward the inner wall surface 1c of the housing 1 as well as in axial direction toward the bearing cover 5a, with its radially and axially projecting sections being slightly squeezed when being placed in the recess of the filler ring 7a and bearing against the inner wall surface 1c of the housing 1 and against the facing bearing cover 5a. The force thus exerted in radial and axial directions upon the filler ring 7a by the profile ring 8a holds the filler ring 7a in light contact with the outer circumferential surface of the metal ring 6a and the outer side of disk 4a.

Even though the forces generated by the rotation of the rotor and acting upon the stationary filler ring 7a in circumferential direction remain small, it may be suitable to provide the filler ring 7a with a safety mechanism by which a rotation thereof is prevented. An example of a suitable safety mechanism is a pin (not shown) mounted in the bearing cover 5a and protruding the filler ring 7a. Moreover, it may be advantageous to provide the filler ring 7a at a suitable location of its circumference with a continuous slot as indicated at 9a in FIG. 1 in order to allow compensation of different heat expansion between metal and plastic material. Persons skilled in the art will recognize that upon installing of the filler ring 7a, the slot will be positioned at a location which is turned by 90° in comparison to the illustration in FIG. 1 because otherwise (here in the outlet area) additional undesired gaps are created.

Preferably, the filler ring 7a and the elastomer ring 8a may be glued with each other at least in some areas to form a one-piece structural unit.

If wear of the filler ring should be reduced to a minimum, it is possible at slight impairment of the sealing effect to omit the axial pressing force by which the filler ring is urged against the external end face of the lateral disk 4a. In this case, the elastomer profile ring is not required to project beyond the filler ring in axial direction or at least is not required to be installed in axially compressed manner, so that the profile ring may also alternatively be arranged between the filler ring and the outer circumferential surface of the metal ring. For sake of simplicity, the arrangement of the profile ring in this manner is not shown in the drawing.

Referring now to FIG. 3, there is shown a second embodiment of a seal arrangement in accordance with the present invention which differs from the seal arrangement of FIG. 2 by the manner in which axial and radial forces are created to urge the filler ring against the external circumferential surface of the metal ring and the outer end face of the respective disk. In the embodiment of the seal arrangement of FIG. 3, the profile ring as shown in FIG. 2 is now substituted by a helical compression spring 8b which urges the filler ring 7b in axial direction against the disk 4b, and by two elastomer rings 8c which radially urge the filler ring 7b against the metal ring 6b. The helical compression spring 8b is situated with one end in a bore 15 of the bearing cover 5b and bears with its other end against the opposing end face of the filler ring 7b. The two elastomer rings 8c are partly received in two circumferential grooves 16 extending about the outer perimeter of the filler ring 7b, and radially project beyond the grooves 16 to bear against the inner wall surface 1c of the housing 1 at slight radial compression so that the sealing gap s is interrupted by the elastomer rings 8c. Thus, the elastomer rings 8c urge the filler ring 7a against the outer circumferential surface of the metal ring 6b.

Suitable materials for the elastomer rings 8c include wear-resistant, elastic plastic materials. By using such material, it is possible to omit the provision of a safety mechanism against rotation as described in connection with FIG. 2. At rotating rotor, the filler ring 7b and the elastomer rings 8c follow the rotation of the rotor at a certain slip relative to the revolution of the rotor.

FIG. 4 shows a third embodiment of a seal arrangement in accordance with the present invention, including a metal ring 6c which is securely fixed e.g. by welding with one axial end to the disk 4b at the outer perimeter thereof. A sealing gap s in prolongation of the sealing gap 14 is defined between the outer perimeter of the metal ring 6c and the cylindrical inner wall surface 1c of the housing 1. The bearing cover 5b is turned out at the circumference thereof so as to exceed the diameter of the cylindrical inner wall surface 1c of the housing 1 and to create in a radial plane an annular surface 1d which is abutted by a two-layered filler ring 7c. In contrast to the filler ring as shown in FIGS. 2 and 3, the filler ring 7c is made of elastic or plastically deformable sealing material. A particular suitable sealing material are those usable for stuffing box packing. Persons skilled in the art will understand that the filler ring 7c is shown by way of example only and may also be of one layer or more than two layers. In general, material for stuffing box packing is available as yard ware which is cut in length depending on the circumference to be covered. Such cut rings are then stacked to attain the required width. In the nonlimiting example of FIG. 4, two such layers are indicated.

Arranged between the filler ring 7c and the bearing cover 5b is a metallic profile ring 8e which is provided with an inner recess for receiving the filler ring 7c in form-fitting manner. At the filler-ring-distant side thereof, the profile ring 8e is loaded by a helical compression spring 8d which extends with its one end in a bore 17 of the bearing cover 5b and with the other end in a suitable recess 18 of the profile ring 8e so as to load the profile ring 8e and thus to urge the filler ring 7c in axial direction against the inner wall surface 1c of the housing 1. Since the filler ring 7c is sandwiched between the profile ring 8e and the inner wall surface 1c of the housing 1, the axial pressure as exerted by the helical compression spring 8d upon the profile ring 8e causes the filler ring 7c to deform also in radial direction towards the metal ring 6c. Depending on the selected sealing material, this deformation may be elastic or plastic. Thus, the filler ring 7c is loaded in axial and radial directions. Since the filler ring 7c is radially deformed by the axial force exerted by the helical compression spring 8d and thus bears against the metal ring 6c, the gap s is interrupted in this region.

The metallic profile ring 8e and the filler ring 7c form a floating seal arrangement which is capable of following the unavoidable radial displacement of the metal ring 6c so that undesired high frictional forces between the inner circumferential surface of the filler ring 7c and the outer perimeter of the metal ring 6c are prevented.

The floating arrangement of the filler ring relative to the housing and the respective bearing cover is a feature of all embodiments of the seal arrangement according to the invention. In this manner, the filler ring is able to follow thermal expansions of the lateral disks of the rotor, a sagging or flexure of the rotor shaft due to high pressure differential between the inlet port and the outlet port, and other influences acting in the manner, without generating additional wear-promoting (compulsive) forces. Only the gap s becomes correspondingly greater or smaller.

While the invention has been illustrated and described as embodied in a rotary feeder with improved seal arrangement between the lateral rotor disk and pertaining bearing cover, it is not intended to be limited to the details shown since various modifications and structural changes may be made without departing in any way from the spirit of the present invention.

What is claimed as new and desired to be protected by Letters Patent is set forth in the appended claims:

1. A rotary feeder; comprising:

a housing defining a cylindrical housing wall and including a lateral bearing cover at each axial side thereof for closing said housing in axial direction;

a rotor defining an axis and being arranged in said housing for transporting material, said rotor including a disk laterally arranged at each axial end at a distance from said pertaining bearing cover; and sealing means arranged between said disk and said bearing cover and including a metal ring which extends coaxial to said rotor axis and perpendicular to said bearing cover, with said metal ring being affixed to said disk at the side facing said bearing cover, a substantially stationary filler ring made of plastic material and surrounding the outer circumferential area of said metal ring, with said filler ring defining an outer surface being spaced from said housing wall of said housing by the width of a sealing gap, and spring means cooperating with said filler ring for loading same in axial and radial directions, said spring means including an elastic profile ring received by said filler ring and projecting beyond said filler ring in axial and radial directions so as to be slightly compressed when abutting said bearing cover and said housing wall.

2. A rotary feeder as defined in claim 1 wherein said filler ring is provided with a recessed outer surface for partly receiving in form-fitting manner said elastic profile ring.

3. A rotary feeder as defined in claim 1 wherein said elastic profile ring is made of elastomer.

4. A rotary feeder as defined in claim 1, and further comprising adhesive means for gluing said profile ring and said filler ring with each other.

5. A rotary feeder as defined in claim 1 wherein said filler ring is provided with a continuous slot at a location of its circumference.

6. A rotary feeder; comprising:

a housing defining a cylindrical housing wall and including a lateral bearing cover at each axial side thereof for closing said housing in axial direction;

a rotor defining an axis and being arranged in said housing for transporting material, said rotor including a disk laterally arranged at each axial end at a distance from said pertaining bearing cover; and sealing means arranged between said disk and said bearing cover and including a metal ring which extends coaxial to said rotor axis and pertaining to said bearing cover, with said metal ring being affixed to said disk at the side facing said bearing cover, a substantially stationary filler ring made of plastic material and surrounding the outer circumferential area of said metal ring, with said filler ring defining an outer surface being spaced from said housing wall of said housing by the width of a sealing gap, and spring means cooperating with said filler ring for loading same in axial and radial directions, said spring means including a helical compression spring extending between said bearing cover and said filler ring for loading said filler ring in axial direction, and at least one elastomer ring arranged between said housing wall and the outer surface of said filter ring for loading said filler ring in radial direction.

7. A rotary feeder as defined in claim 6 wherein said filler ring is provided with a circumferential groove for partly receiving said elastomer ring.

8. A rotary feeder; comprising:
a housing having a cylindrical housing wall and including a lateral bearing cover at each axial side thereof for closing said housing in axial direction;
a rotor defining an axis and being arranged in said housing for transporting material, said rotor including a disk laterally arranged at each axial end at a distance from said pertaining bearing cover; and
sealing means arranged between said disk and said bearing cover and including a metal ring extending coaxial to said rotor axis in direction of said bearing cover and being affixed to said disk at the perimeter thereof, with said metal ring having an outer circumferential surface being spaced from said housing wall by the width of a sealing gap, wherein said housing defines an interior which is provided with enlarged diameter in the area of said outer circumferential surface of said metal ring to define in a radial plane an annular surface, said sealing means further including a substantially stationary filler ring having an outer circumference bearing against said annular surface, and a spring-loaded metallic profile ring urging said filler ring in axial direction toward said annular surface and at least partly surrounding the outer circumference of said filler ring.

9. A rotary feeder as defined in claim 8 wherein said filler ring is made of elastic sealing material.

10. A rotary feeder as defined in claim 8 wherein said filler ring is made of plastically deformable sealing material.

11. A rotary feeder as defined in claim 8 wherein said filler ring is made of a stuffing box sealing material.

12. A seal arrangement for a rotary feeder of a type including a housing with a cylindrical housing wall and a lateral bearing cover at each axial and for axially closing the housing, and a rotor defining an axis arranged in said housing for transporting material and having a disk laterally arranged at each axial end of the rotor at a distance from said bearing cover, said seal arrangement comprising:
a metal ring arranged between said disk and said bearing cover and being affixed with one end thereof to said disk, said metal ring extending coaxial to said rotor axis and perpendicular to said bearing cover;
a plastic filler ring loosely surrounding said metal ring and defining with said housing wall a sealing gap; and
spring means for forcing said filler ring in radial direction against said metal ring and in axial direction against said disk, with said filler ring being essentially sandwiched between said metal ring and said spring means, said spring means including an elastic profile ring which is partly received in a recess of said filler ring in slightly compressed manner so as to exert radial and axial forces upon said filler ring.

13. A seal arrangement for a rotary feeder of a type including a housing with a cylindrical housing wall and a lateral bearing cover at each axial end for axially closing the housing, and a rotor defining an axis arranged in said housing for transporting material and having a disk laterally arranged at each axial end of the rotor at a distance from said bearing cover, said seal arrangement comprising:
a metal ring arranged between said disk and said bearing cover and being affixed with one end thereof to said disk, said metal ring extending coaxial to said rotor axis and perpendicular to said bearing cover;
a plastic filler ring loosely surrounding said metal ring and defining with said housing wall a sealing gap; and
spring means for forcing said filler ring in radial direction against said metal ring and in axial direction against said disk, with said filler ring being essentially sandwiched between said metal ring and said spring means, said spring means including a helical compression spring between said bearing cover and said filler ring for loading said filler ring in axial direction, and at least one elastomer ring arranged between said housing and the outer perimeter of said filler ring for loading said filler ring in radial direction.

14. A seal arrangement for a rotary feeder of a type including a housing with a cylindrical housing wall and a lateral bearing cover at each axial end thereof for axially closing said housing, and a rotor arranged in said housing for transporting material and having a disk laterally arranged at each axial end of the rotor at a distance from said bearing cover, said seal arrangement comprising:
a metal ring being affixed to said disk at the perimeter thereof, with said metal ring having an outer circumferential surface being spaced from said housing wall to define a sealing gap, with said housing being provided with enlarged diameter in the area of said outer circumferential surface of said metal ring to define an annular surface in a radial plane;
a substantially stationary filler ring having an outer perimeter and bearing against said annular surface; and
a spring-loaded metallic profile ring urging said filler ring in axial direction toward said annular surface and at least partly surrounding the outer perimeter of said filler ring.

* * * * *

UNITED STATES PATENT AND TRADEMARK OFFICE
CERTIFICATE OF CORRECTION

PATENT NO. : 5,201,441

DATED : April 13, 1993

INVENTOR(S) : Hans HOPPE, Walter BEIRLE, Rudolf FÜHL

It is certified that error appears in the above-identified patent and that said Letters Patent is hereby corrected as shown below:

Column 6, line 63, correct "pertaining" to -- perpendicular --.

Column 7, line 51, correct "at each axial and" to
-- at each axial end --.

Signed and Sealed this

Eleventh Day of January, 1994

Attest:

BRUCE LEHMAN

Attesting Officer

Commissioner of Patents and Trademarks